(12) United States Patent
Fuhri

(10) Patent No.: US 11,135,044 B1
(45) Date of Patent: Oct. 5, 2021

(54) DENTAL BRUSH DEVICE

(71) Applicant: Jody Michelle Fuhri, Parker, CO (US)

(72) Inventor: Jody Michelle Fuhri, Parker, CO (US)

(*) Notice: Subject to any disclaimer, the term of this patent is extended or adjusted under 35 U.S.C. 154(b) by 120 days.

(21) Appl. No.: 16/371,538

(22) Filed: Apr. 1, 2019

Related U.S. Application Data

(60) Provisional application No. 62/651,556, filed on Apr. 2, 2018.

(51) Int. Cl.
*A61C 17/20* (2006.01)
*A46B 15/00* (2006.01)
*A46B 9/08* (2006.01)

(52) U.S. Cl.
CPC .......... *A61C 17/20* (2013.01); *A46B 15/0016* (2013.01); *A46B 9/08* (2013.01); *A46B 2200/1066* (2013.01)

(58) Field of Classification Search
CPC ....... A61C 17/005; A61C 17/20; A61C 17/22; A61C 17/16; A61C 17/18; A61C 17/222; A61C 17/3481; A61C 3/00; A61C 19/00; A46B 15/0016; A46B 15/0032; A46B 9/02; A46B 9/04; A46B 9/08; A46B 2200/1066; A46B 17/00; A46B 5/0095; A46B 13/00
USPC .......................................... 433/119, 126, 141
See application file for complete search history.

(56) References Cited

U.S. PATENT DOCUMENTS

| 5,071,348 A | * | 12/1991 | Woog | A61C 17/26 |
| | | | | 433/118 |
| 5,369,831 A | * | 12/1994 | Bock | A46B 7/04 |
| | | | | 15/167.1 |
| 5,546,624 A | * | 8/1996 | Bock | A46B 7/04 |
| | | | | 15/167.1 |
| 5,899,693 A | * | 5/1999 | Himeno | A61C 17/20 |
| | | | | 433/118 |
| 6,363,565 B1 | * | 4/2002 | Paffrath | A46B 9/04 |
| | | | | 15/22.1 |
| 6,554,614 B1 | * | 4/2003 | Dubbe | A46B 3/005 |
| | | | | 15/167.1 |
| 7,784,144 B2 | * | 8/2010 | Renault | A61C 17/222 |
| | | | | 15/257.01 |
| 2005/0026103 A1 | * | 2/2005 | Wasylucha | A61N 5/0603 |
| | | | | 433/29 |
| 2007/0212662 A1 | * | 9/2007 | Grez | A61C 17/22 |
| | | | | 433/80 |
| 2008/0255549 A1 | * | 10/2008 | Rose | A61C 17/20 |
| | | | | 606/15 |

(Continued)

OTHER PUBLICATIONS

"Rubber—Additives." Encyclopaedia Britannica, Encyclopaedia Britannica, Inc., 2015, www.britannica.com/science/rubber-chemical-compound/Additives. (Year: 2015).*

Primary Examiner — Jacqueline T Johanas
Assistant Examiner — Thomas Drew Agger
(74) Attorney, Agent, or Firm — Schwegman Lundberg & Woessner, P.A.

(57) ABSTRACT

A brush device for an ultrasonic scaler includes: a base having a first end and an opposite second end, the first end and the second end define a longitudinal axis of the base; an insert housing extending from the first end of the base, the insert housing defines an opening sized and shaped to receive a distal end of the ultrasonic scaler and secure the brush device thereto; and a cleaning element extending from the second end of the base, the cleaning element is substantially parallel to the longitudinal axis.

20 Claims, 9 Drawing Sheets

(56) References Cited

U.S. PATENT DOCUMENTS

2017/0333169 A1* 11/2017 Hoang ................. A61C 17/005
2019/0015183 A1* 1/2019 Liu ........................ A61C 17/22
2019/0247981 A1* 8/2019 Vetter ...................... A46B 9/04

* cited by examiner

DENTAL BRUSH DEVICE

CROSS-REFERENCE TO RELATED APPLICATION

This application claims priority to and is a non-provisional of U.S. Application Ser. No. 62/651,556 for a "Dental Brush Device" filed on Apr. 2, 2018, the contents of which are incorporated herein by reference in its entirety.

FIELD

This disclosure relates to the field of dental tools. More particularly, this disclosure relates to a device for enhancing existing ultrasonic dental cleaning tools.

BACKGROUND

Ultrasonic tooth scalers may use a transducer to convert electricity into mechanical energy and generate operating frequencies of between 20-45 kilohertz (kHz) or more at the cleaning tip of the device. Additionally, fluid (e.g., water) is provided at the cleaning tip during device operation to cool and lubricate the tip. The ultrasonic vibrations induce high and low pressure areas around the cleaning tip that results in cavitation of the fluid. Under cavitation, vapor cavities (e.g., liquid-fee bubbles or voids within the liquid) are formed when the pressure is relatively low and implode when subjected to high pressure, thereby releasing energy that weaken plaque and stain on teeth. As such, the cleaning tip enables removal of supra-gingival plaque and stain from teeth.

However, these cleaning tips are relatively small, for example, measured in millimeters (mm) and between 0.5 mm and 3 mm, such that a dental hygienist often needs to make several passes over an area to remove the plaque and stain. Furthermore, the cleaning tip is typically formed from metal material, which is undesirable to use with orthodontic appliances, crowns and bridges, dentures, and other dental work.

SUMMARY

The above and other needs are met by a brush device for installation on an ultrasonic scaler. The brush device is advantageously secured to the ultrasonic scaler such that the brush device may be easily installed or removed. The brush device enhances an effectiveness of the ultrasonic scaler and allows for cleaning of a greater area using the ultrasonic scaler. The brush device is adapted to fit to existing ultrasonic scalers without requiring modification to the ultrasonic scaler.

In a first aspect, a brush device for an ultrasonic scaler includes: a base including a first end and an opposite second end, the first end and the second end define a longitudinal axis of the base; an insert housing extending from the first end of the base, the insert housing defines an opening sized and shaped to receive a distal end of the ultrasonic scaler and secure the brush device thereto; and a cleaning element extending from the second end of the base, the cleaning element is substantially parallel to the longitudinal axis.

In one embodiment, the cleaning element includes a tuft of bristles. In another embodiment, the tuft of bristles includes a head that is substantially orthogonal to the longitudinal axis.

In yet another embodiment, the insert housing extends towards the second end more than half a length of the base. In one embodiment, the insert housing includes one or more channels defined on an inner surface.

In another embodiment, the base is tapered in width from the first end of the base to the second end of the base. In yet another embodiment, the base has a diamond-shaped profile along a length of the base.

In one embodiment, the brush device further includes a tool for removal of the brush device, the tool including: a first end and a second end located distal therefrom; a hole formed on the first end of the tool, the hole sized to at least partially receive the brush device within the hole of the tool; a slot formed in the second end of the tool, the slot sized to at least partially receive a portion of the brush device for removal of the brush device from an ultrasonic scaler. In another embodiment, the tool has a dog-leg shape between the first end and the second end of the tool.

In a second aspect, a brush device for an ultrasonic scaler includes: a base having a first end and an opposite second end, the first end and the second end define a longitudinal axis of the base; an insert housing extending from the first end of the base, the insert housing defining an opening sized and shaped to receive a distal end of the ultrasonic scaler and secure the brush device thereto; and a cleaning element comprising a tuft of bristles and extending from the second end of the base, the cleaning element being substantially parallel to the longitudinal axis.

In one embodiment, the tuft of bristles comprises a head that is substantially orthogonal to the longitudinal axis.

In another embodiment, the insert housing extends towards the second end more than half a length of the base. In yet another embodiment, the insert housing comprises one or more channels defined on an inner surface.

In a third aspect, a brush device for an ultrasonic scaler includes: a base including a first end and an opposite second end, wherein the first end and the second end define a longitudinal axis of the base; an insert housing extending from the first end of the base, the insert housing defining an opening sized and shaped to receive a distal end of the ultrasonic scaler and secure the brush device thereto and the insert housing extending towards the second end more than half a length of the base; and a cleaning element comprising a tuft of bristles and extending from the second end of the base, the cleaning element being substantially parallel to the longitudinal axis.

In one embodiment, the tuft of bristles includes a head that is substantially orthogonal to the longitudinal axis. In another embodiment, the insert housing includes one or more channels defined on an inner surface.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Figure 1:
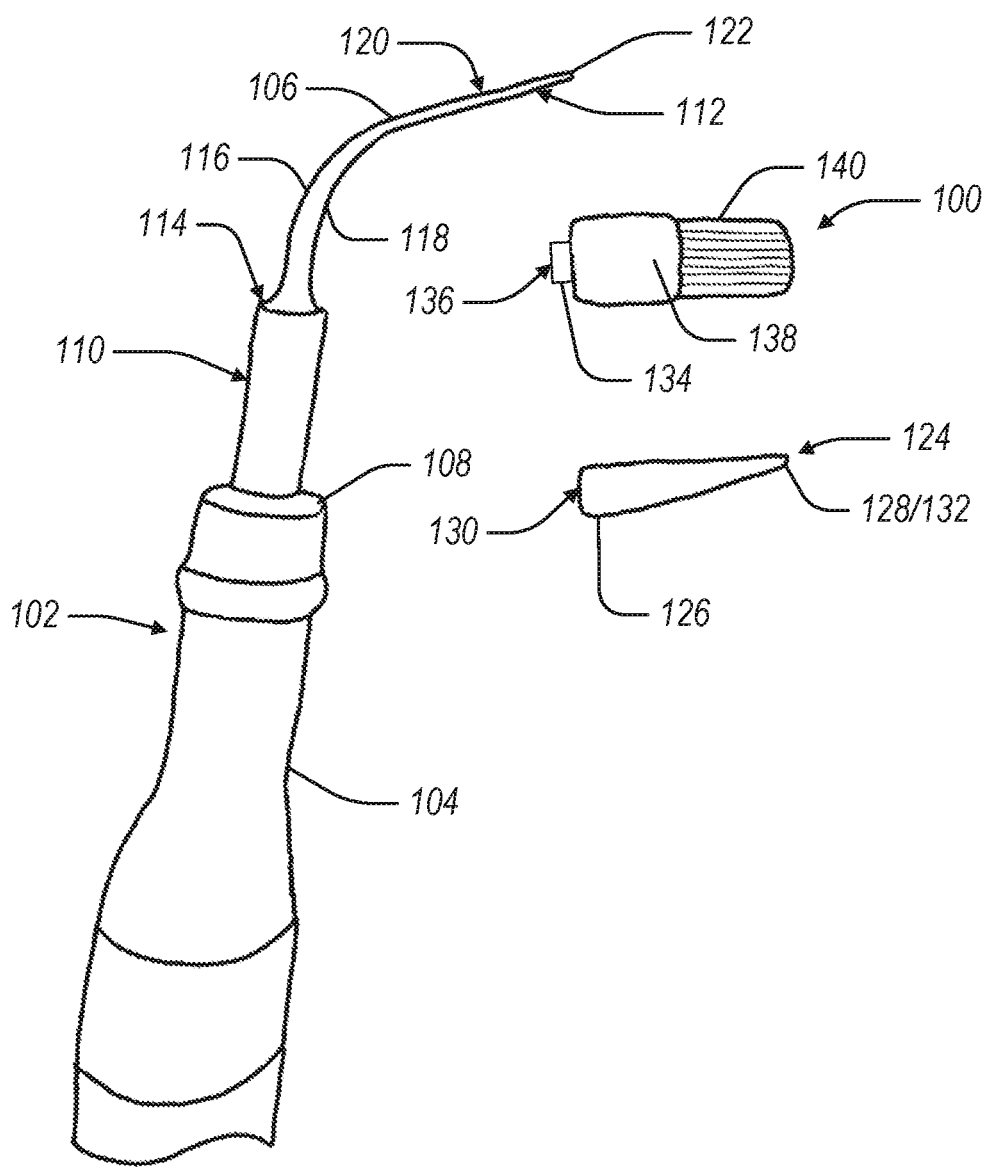
FIG. 1 is a perspective view of an exemplary brush device and ultrasonic scaler according to one embodiment of the present disclosure.

FIG. 1 is a perspective view of an exemplary brush device 100 and ultrasonic scaler 102. The ultrasonic scaler 102 includes a handle 104 and a removable cleaning tip 106 (e.g., insert) extending from a distal end 108 of the handle 104. The handle 104 includes a transducer (not shown) to convert electricity into mechanical energy at the cleaning tip 106. In some examples, the transducer may be magnetostrictive or piezoelectric. The transducer vibrates the cleaning tip 106 at an ultrasonic frequency to induce a cavitation effect that may be used to clean teeth. The handle 104 may also have a coolant inlet line (not shown) to channel coolant (e.g., water) to the cleaning tip 106.

The cleaning tip 106 may include an elongated proximal end 110 that is configured to be received within the distal end 108 of the handle 104 and be secured therein. Opposite the proximal end 110, the cleaning tip 106 has a distal end 112 that is solid and configured to vibrate at high frequencies. In the example, the transition between the proximal end 110 and the distal end 112 of the cleaning tip 106 includes a coolant outlet 114 that is configured to channel coolant towards the distal end 112 and cool the end, as well as, provide the fluid for cavitation during operation. In the example, the distal end 112 includes a convex backside 116 and an opposite concave frontside 118. A lateral surface 120 extends from the backside 116 and terminates at a point 122. In other examples, the distal end 112 of the cleaning tip 106 may have any size and/or shape that enables the ultrasonic scaler 102 to function as described herein. It is appreciated that while one example of an ultrasonic scaler 102 and cleaning tip 106 is depicted in the figures, the brush device 100 as described herein may be used with any type of ultrasonic scaler 102 known in the dental field.

In operation, the lateral surface 120 may be the primary surface used for teeth cleaning and may vibrate either in a linear direction or an oval/circular direction. The cleaning tip 106 is typically formed from a metal material, which is undesirable to use with orthodontic appliances, crowns and bridges, dentures, and other dental work. As such, to clean implants and other dental work a plastic adapter 124 may be used. The adapter 124 may be substantially conical-shaped and include a first end 126 and a second end 128. The first end 126 has an opening 130 that extends towards, but not all the way to, the second end 128. The opening 130 is shaped to correspond to the distal end 112 the cleaning tip 106 so that the adapter 124 may be press fit thereon. The press fit frictionally secures the adapter 124 onto the distal end 112 such that high frequency vibration does not disengage the two components. To remove the adapter 124 a tool (not shown) may be used or it may be removed manually. The second end 128 of the adapter 124 may include a point 132 that is similar to the point 122 on the cleaning tip 106.

The point 122 of the cleaning tip 106 is relatively small (e.g., between 0.5 mm and 3 mm) and, as such, the lateral surface 120 may be required to make several passes over an area on the tooth to remove plaque and stain. Even with the adapter 124 secured over the point 122, the adapter 124 may still be required to make several passes for cleaning because it is not much larger in size than the distal end 112 of the cleaning tip 106. By having to make several cleaning passes along the tooth, streaks of plaque and stain may remain on the tooth and/or the amount of time needed for cleaning may be increased. Accordingly, the brush device 100 as described herein may be attached onto the cleaning tip 106 and be used to remove plaque and stain from teeth more efficiently.

The brush device 100 includes an insert housing 134 having an opening 136 to enable the brush device 100 to be press fit onto the distal end 112 of the cleaning tip 106. A base 138 extends about the insert housing 134 and supports a cleaning element 140 extending therefrom. In the example, the cleaning element 140 may include a tuft of bristles. By using bristles instead of the lateral surface 120 of the cleaning tip 106, the number of passes needed by the ultrasonic scaler 102 to clean a tooth decreases, thereby decreasing the cleaning procedure time. Additionally, residual plaque and stain streak marks along the tooth is decreased and/or eliminated. Furthermore, the bristles may be formed from a plastic-based material so that the ultrasonic scaler 102 may be used for cleaning implants and other dental appliances.

Figure 2A:
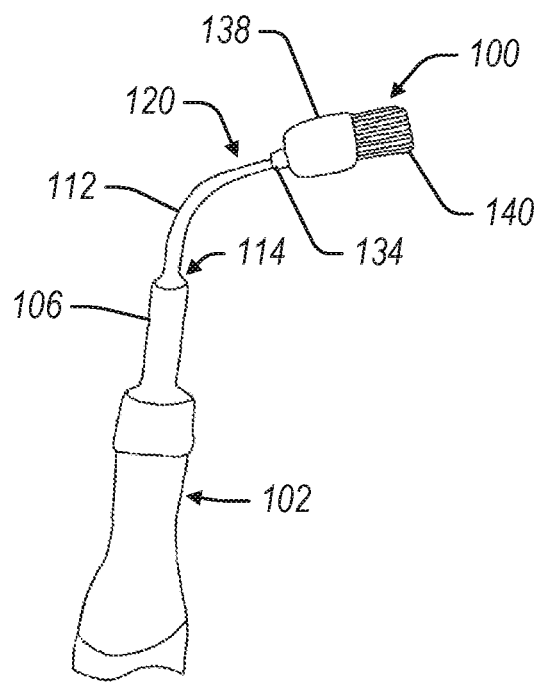
FIGS. 2A and 2B are side views of the brush device coupled to the ultrasonic scaler according to one embodiment of the present disclosure.
Figure 2B:
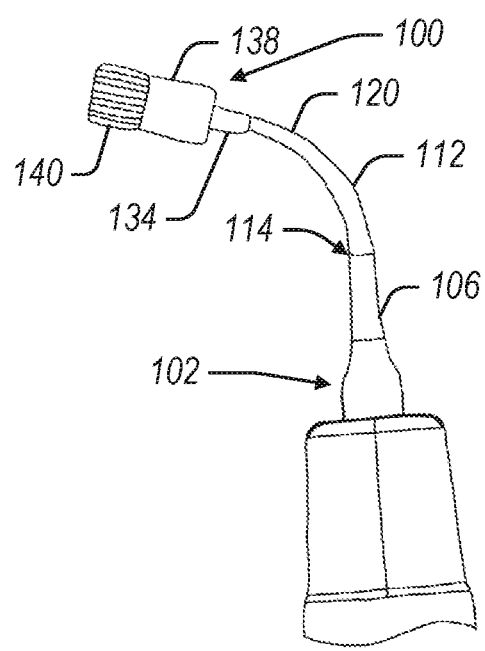

FIGS. 2A and 2B are side views of the brush device 100 coupled to the ultrasonic scaler 102. Referring concurrently to FIGS. 2A and 2B, to attach the brush device 100 to the ultrasonic scaler 102, the point 122 (shown in FIG. 1) of the cleaning tip 106 is inserted within the insert housing 134 of the brush device 100 in a press fit connection. This press fit connection frictionally engages an inner surface 142 (shown in FIG. 3) of the insert housing 134 with the lateral surface 120 of the cleaning tip 106. The frictional engagement enables a dental hygienist to secure the brush device 100 onto the cleaning tip 106 and operate the ultrasonic scaler 102 without the brush device 100 disengaging from the cleaning tip 106. However, after use of the brush device 100, the dental hygienist may easily remove the brush device 100 from the cleaning tip 106 for disposal of the brush device 100 and sterilization of the cleaning tip 106. In some examples, a tool may be utilized to remove the brush device 100 from the cleaning tip 106 as described further below in reference to FIGS. 7A-7D.

In the example, the insert housing 134 is sized to correspond to the size of the cleaning tip 106 to ensure a secure press fit connection. Because the cleaning tip 106 may have varying sizes and shapes (e.g., to clean specific areas of teeth), the insert housing 134 may include one or more indicia to identify the size of the insert housing 134. For example, the insert housing 134 may be color-coded based on the size of the opening of the insert housing 134. In other examples, the indicia may additionally or alternatively include a marking or symbol to correspond to the size of the opening of the insert housing. In other examples, the indicia may be formed on the base 138 and/or the cleaning element 140.

When secured on the ultrasonic scaler 102, the brush device 100 only covers a portion of the lateral surface 120 of the cleaning tip 106 so that the coolant outlet 114 is unobstructed. As such, coolant can still be channeled towards the distal end 112 to cool the cleaning tip 106 and provide fluid for cavitation. Additionally, the brush device 100 vibrates with the distal end 112 such that cavitation is still induced for teeth cleaning, while the cleaning element 140 functions to clear the teeth of the removed plaque and stain. Furthermore, the cleaning element 140 is configured to also be used with prophy paste so that the ultrasonic scaler 102 may also be used for polishing. Thus, eliminating the need of a second polishing device for teeth cleaning procedures.

Figure 3:
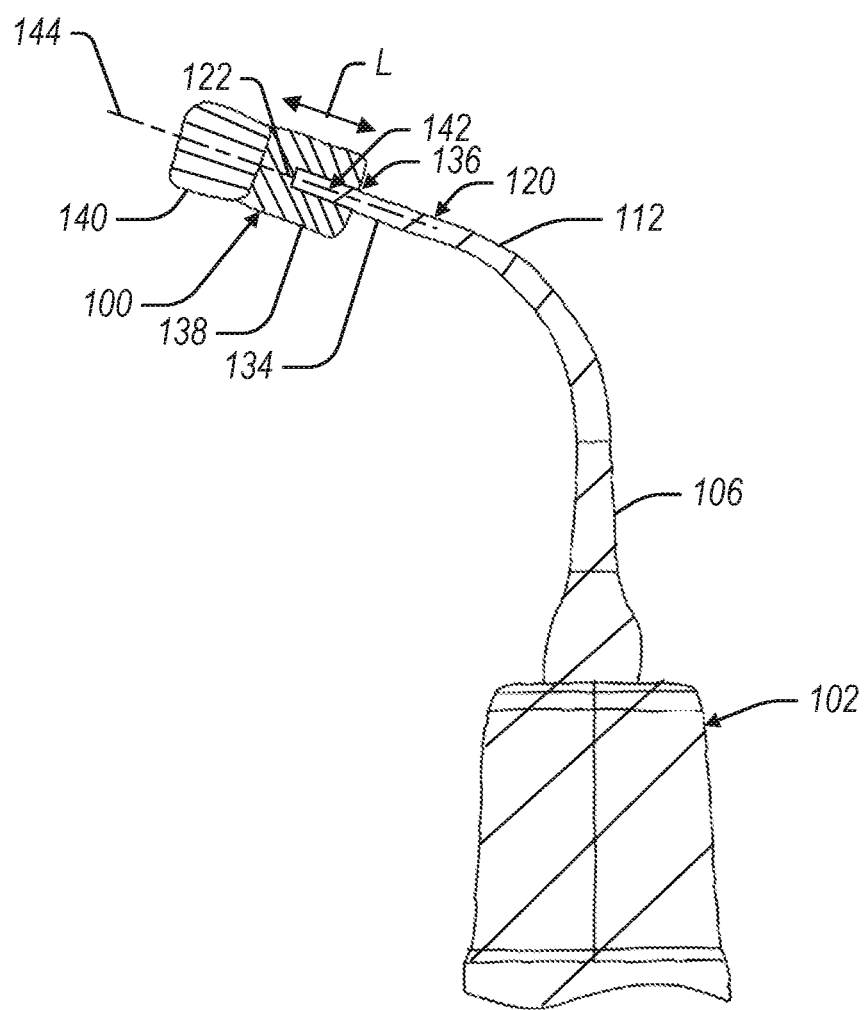
FIG. 3 is a cross-sectional view of the brush device coupled to the ultrasonic scaler according to one embodiment of the present disclosure.

FIG. 3 is a cross-sectional view of the brush device 100 coupled to the ultrasonic scaler 102. In the example, the insert housing 134 may extend into the base 138, but not entirely through the entire length L of the base 138. For example, the insert housing 134 extends more than ½ the length of the base 138 so that the brush device 100 may be secured to the distal end 112 without undesirably disengaging as described herein. In other examples, the insert housing 134 may extend between ½ and ¾ of the length of the base 138. In further examples, the insert housing 134 may extend more than ¾ of the length of the base 138.

Figure 8:
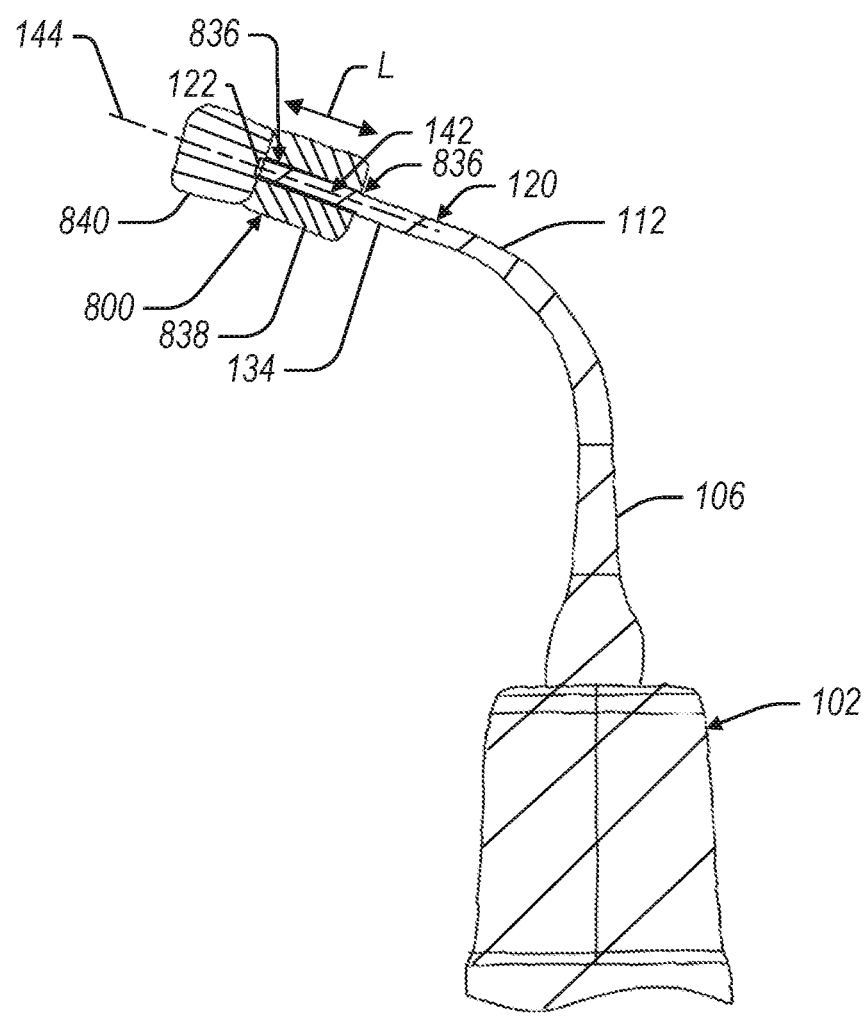
FIG. 8 illustrates a brush device with an ultrasonic scaler in an example.

Additionally, in the example, the opening 136 extends the entire way through the insert housing 134 so that the point 122 of the distal end 112 may extend through the insert housing 134 and be positioned adjacent to the base 138. In other examples, the insert housing 134 may have the end that is within the base 138 be enclosed such that the point 122 of the distal end 112 is fully enclosed within the insert housing 134. In alternative embodiments, the insert housing 134 may extend the entire way through the length L of the base 138 and the opening 136 extends the entire way through the insert housing 134 so that the point 122 of the distal end 112 is positioned proximate the cleaning element 140 and can more easily dissipate heat during operation of the ultrasonic scaler 102 (e.g., see brush device 800 having an opening 836 through base 838 extending to cleaning element 840 in FIG. 8). That is, when the point 822 is within the cleaning element 840, the coolant can more easily reach the point 122 to keep the cleaning tip 106 cool. In other examples, the inner surface 142 of the insert housing 134 may include one or more channels (not shown) extending therethrough. For example, one or more channels extending radially from the opening 136 and along the entire length of the insert housing 134. The channels are configured to enable coolant (e.g., water) to flow along the lateral surface 120 and towards the point 122 for cooling the cleaning tip 106 during operation.

In the example, the lateral surface 120 of the cleaning tip 106 defines a longitudinal axis 144. The brush device 100 is coupled to the distal end 112 such that the brush device 100 extends along the longitudinal axis 144 and the cleaning element 140 extends substantially parallel to the longitudinal axis. 144. As such, the shape of the distal end 112 may still be used to access teeth areas as required or desired with the brush device 100 extending therefrom.

Figure 4A:
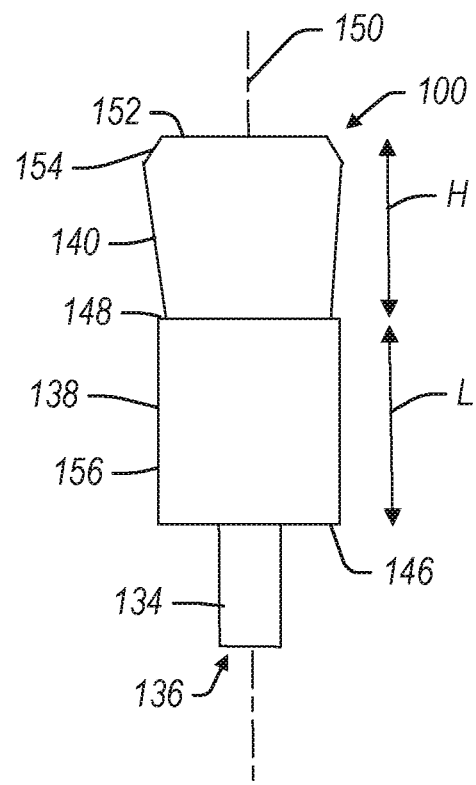
FIG. 4A is a side view of the brush device according to one embodiment of the present disclosure.
Figure 4B:
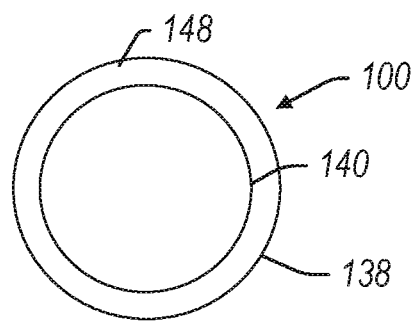
FIG. 4B is a top view of the brush device according to one embodiment of the present disclosure.

FIG. 4A is a side view of the brush device 100. FIG. 4B is a top view of the brush device Referring concurrently to FIGS. 4A and 4B, the brush device 100 includes the insert housing 134 having the opening 136 to enable the brush device 100 to be press fit onto the ultrasonic scaler as described above. The base 138 extends about the insert housing 134 and supports the cleaning element 140. In the example, the base 138 is substantially cylindrical in shape having a first end 146 and an opposite second end 148 defining the length L thereof. The base 138 may be formed out of an elastomeric rubber-type material. The base 138 defines a longitudinal axis 150 that extends along the length L.

Extending from the first end 146 is the insert housing 134 along the longitudinal axis 150. By extending the insert housing 134 from the base 138, the surface area for frictional engagement with the ultrasonic scaler increases, thereby enabling the brush device 100 to vibrate with the cleaning tip. In other examples, the first end 146 of the base 138 may not include the insert housing, and the base 138 defines the opening 136 such that the base 138 directly engages with the cleaning tip. The insert housing may be formed with plastic or composite materials.

Extending from the second end 148 is the cleaning element 140 along the longitudinal axis 150. In the example, the cleaning element 140 may be offset from the perimeter of the second end 148, as illustrated in FIG. 4B. The cleaning element 140 may include a circular tuft of bristles that extends substantially straight and parallel to the longitudinal axis 150. The bristles may be sufficiently ridged so as to vibrate with the cleaning tip as described herein. Such bristles may be made polymeric and may include, for example, polyamide or polyester. The individual bristles may have a uniform diameter across the entire tuft, or sizes may vary within the tuft. In other examples, the cleaning element 140 may also include elastomeric structures (e.g., ridges, bumps, etc.), foams, and combinations thereof.

In the example, a head 152 of the cleaning element 140 may be substantially orthogonal to the longitudinal axis 150 such that the tuft is squared off and can be used to provide prophy paste for polishing. In other examples, the head 152 may be round, tapered, pointed, or any other shape as required or desired. For example, the perimeter of the head 152 may include a taper 154. Additionally, or alternatively, the bristles maybe more flexible and formed from soft plastic material such as rubber or thermoplastic elastomer (TPE). By using bristles, the brush device 100 may be used with dental implants and other dental and orthodontic appliances. In some examples, some or all of the cleaning element 140 may extend from at least a portion of a sidewall 156 of the base 138 (e.g., orthogonal to the longitudinal axis 150) so that the sides of the base 138 may be used for teeth cleaning. In examples, the cleaning element 140 that extends from the sidewall 156 may have a shorter height than the cleaning element 140 extending from the second end 148. The cleaning element 140 may be securely attached to the base 138 in any suitable manner. For example, stapling, gluing, or molding. In examples, the cleaning element 140 may have any suitable height H, as required or desired. For example, the cleaning element 140 may have a height H between 2 mm and 6 mm. In other examples, the cleaning element 140 may have a height H between 3 mm and 5 mm. In further examples, the cleaning element 140 may have a height H of approximately 4 mm. In still other examples, the cleaning element 140 may have a height H that is approximately equal to the length L of the base 138.

Figure 5A:
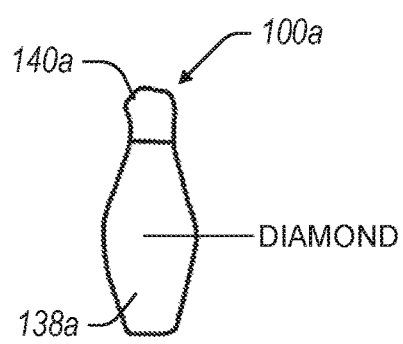
FIGS. 5A-5C are alternative configurations of the brush device according to one embodiment of the present disclosure.
Figure 5B:
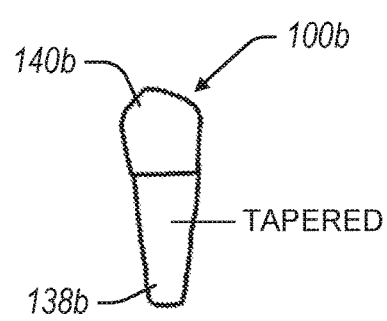
Figure 5C:
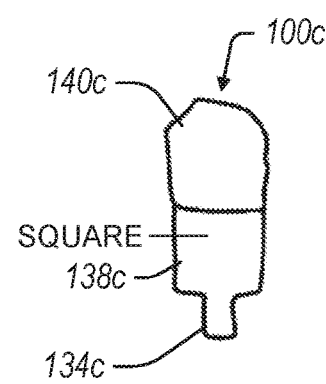

FIGS. 5A-5C are alternative configurations of the brush device. Certain components are described above, and as such, are not necessarily described further. FIG. 5A illustrates a brush device 100a with a diamond shaped base 138a. In this example, since the base 138a is in a more elongate configuration and the insert housing is not required because the base 138a can be directed coupled to the ultrasonic device. Additionally, a cleaning element 140a may be smaller than the example described above for more detailed cleaning.

FIG. 5B illustrates a brush device 100b with a tapered, frustoconical shaped base 138b. In this example, the base 138b is elongated so as to not require the insert housing, although one may be used as required or desired. FIG. 5C illustrates a brush device 100c with a square shaped base 138c. In the examples illustrated in FIGS. 5A-5C, the different shaped bases enable for selective positioning of the ultrasonic scaler during teeth cleaning operations.

Figure 6:
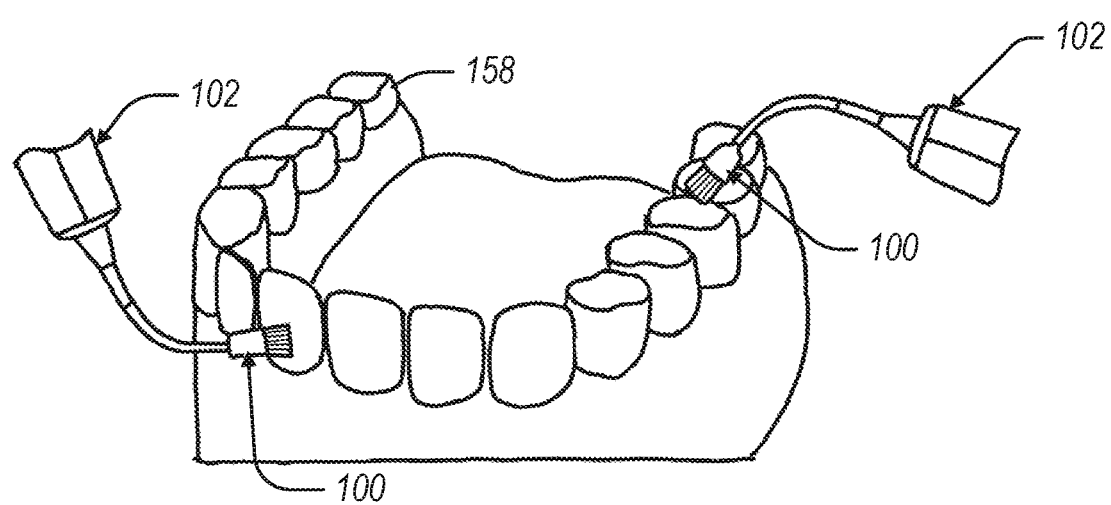
FIG. 6 is a perspective view of the brush device and ultrasonic scaler cleaning teeth according to one embodiment of the present disclosure.

FIG. 6 is a perspective view of the brush device 100 and ultrasonic scaler 102 cleaning teeth 158. The brush device 100, including the insert housing, the base, and the cleaning element are sized to fit within a patient's mouth for teeth cleaning procedures. In operation, the brush device 100 is used for cleaning procedures on the teeth 158 and above the gum line. The cleaning element enables for plaque and stain to be removed. Additionally, or alternatively, the brush device 100 can be used with prophy paste or other chemical substances so that the ultrasonic scaler 102 can also polish the teeth 158. This enables for the number of tools used for teeth cleaning procedures to be reduced.

FIGS. 7A-7D illustrate exemplary installation and removal steps of the brush device 100 to and from the ultrasonic scaler 102. Referring concurrently to FIGS. 7A-7D, a tool 160 may be used to install and/or remove the brush device 100 to and from the ultrasonic scaler 102. In the example, the tool 160 includes a first end 162 and an opposite second end 164. The tool 160 may have a dog-leg shape such that the first end 162 is oriented at an angle from the second end 164. In other examples, the tool 160 may have any other shape that enables the tool to function as described herein, such as a straight bar-shape. The first end 162 may include a hole 166 defined therein that is sized and shaped to receive a portion of the brush device 100. In an example, the hole 166 may extend through the entire thickness of the tool 160. In other examples, the hole 166 may extend only partially through the thickness of the tool 160. The second end 164 may include a slot 168 defined therein that is sized and shaped to receive a portion of the brush device 100 and/or the ultrasonic scaler 102. In an example, the slot 168 may extend in a direction that is substantially orthogonal to the direction of the hole 166.

Figure 7A:
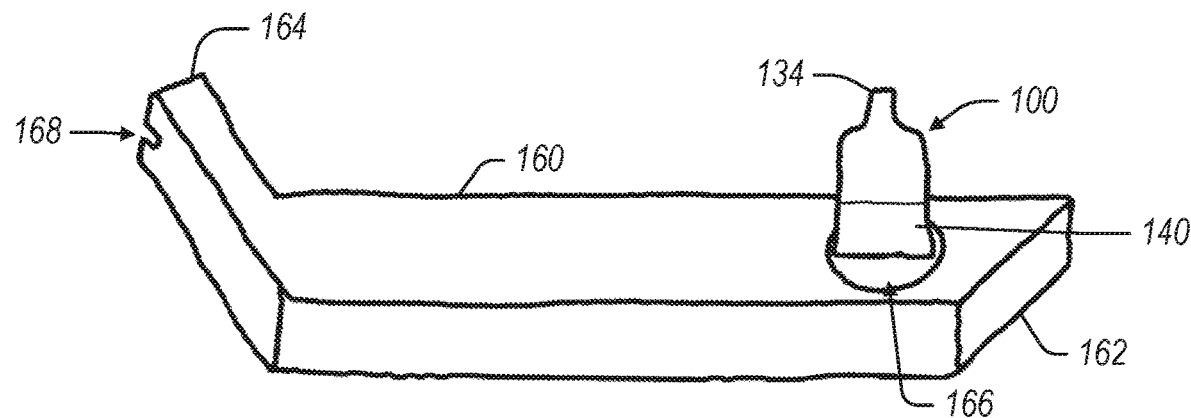
FIGS. 7A-7D illustrate exemplary installation and removal steps of the brush device to and from the ultrasonic scaler according to one embodiment of the present disclosure.

Beginning with FIG. 7A, the brush device 100 may be installed onto the ultrasonic scaler by placing the brush device 100 onto the tool 160. More specifically, the cleaning element 140 may be placed at least partially into the hole 166 at the first end 162 of the tool 160. As such, the insert housing 134 may be oriented in an upwards direction such that it may receive the ultrasonic scaler.

Figure 7B:
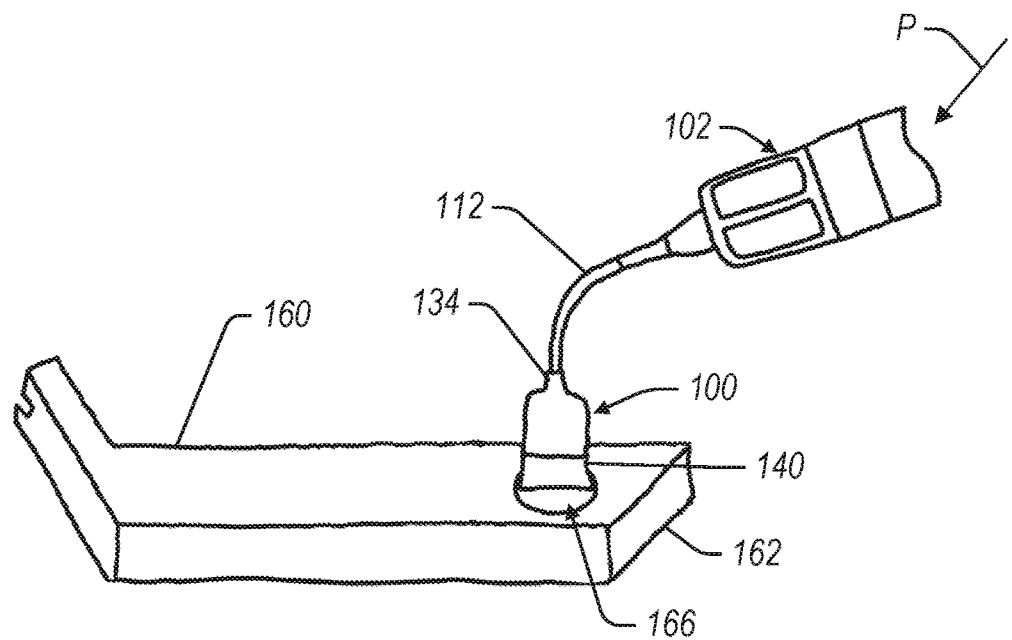

Turning now to FIG. 7B, the distal end 112 of the ultrasonic scaler 102 may be inserted into the insert housing 134 while the brush device 100 is supported on the tool 160. In some examples, the ultrasonic scaler 102 is twisted (e.g. ¼ of a turn) while applying pressure P to secure the brush device 100 to the ultrasonic scaler 102. The tool 160 may then be removed from the brush device 100 and the dental hygienist may carefully tug on the brush device 100 to verify that it is secure on the ultrasonic scaler 102. The coolant flow to the ultrasonic scaler 102 can be regulated so that a fine spray is channeled from the scaler and the coolant is flowing over the brush device 100.

Figure 7C:
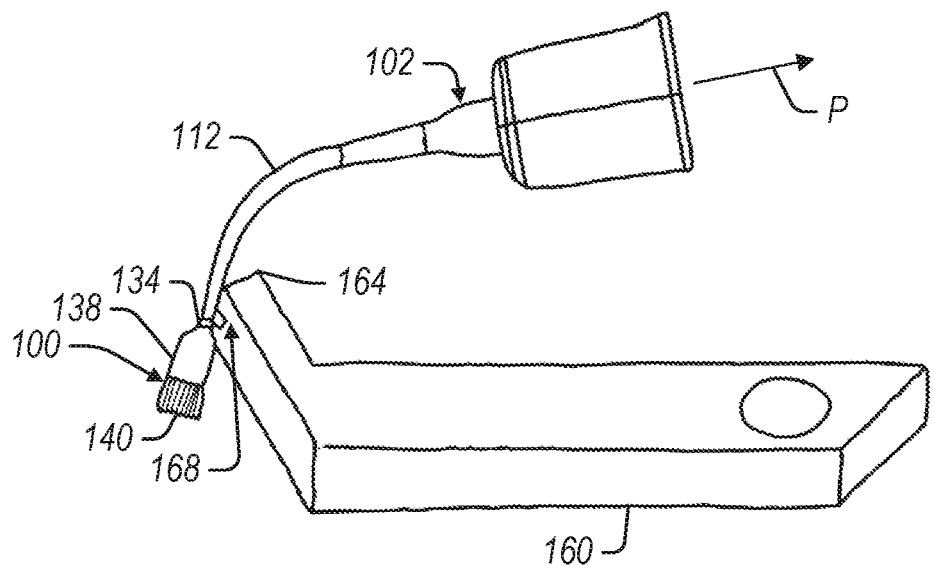

After the cleaning procedure is finished, the brush device 100 may then be removed from the ultrasonic scaler 102 and disposed of in accordance with known standards for disposal of biohazard materials. As illustrated in FIG. 7C, the brush device 100 may be placed onto the tool 160. More specifically, the insert housing 134 is placed within the slot 168 at the second end 164 of the tool 160. As such, the tool 160 may be used for leverage against the base 138 to remove the brush device 100 from the ultrasonic scaler 102. In other examples, the distal end 112 of the ultrasonic scaler 102 may be placed within the slot 168 such that the base 138 is adjacent to the tool 160.

Figure 7D:
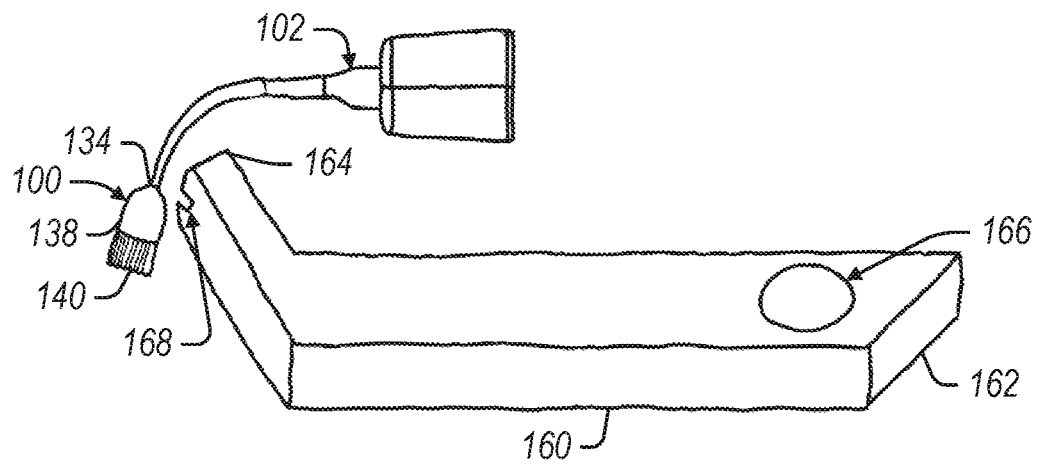

Turning now to FIG. 7D, once the brush device 100 is partially disposed within the slot 168, the ultrasonic scaler 102 is pulled P in a downward direction and away from the tool 160. The tool 160 holds the brush device 100 in place, via the base 138, such that the brush device 100 disengages with the ultrasonic scaler 102. The dental hygienist may place a finger and/or thumb over the brush device 100 to assist in securing the brush device 100 to the tool 160.

Any number of the features of the different examples described herein may be combined into one single example and alternate examples having fewer than or more than all of the features herein described are possible. It is to be understood that terminology employed herein is used for the purpose of describing particular examples only and is not intended to be limiting. It must be noted that, as used in this specification, the singular forms "a," "an," and "the" include plural referents unless the context clearly dictates otherwise.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A dental cleaning system for an ultrasonic scaler, the system comprising:
   a brush device for the ultrasonic scaler, the brush device including:
   a base comprising a first end and an opposite second end, wherein the first end and the second end define a longitudinal axis of the base;
   an insert housing extending from the first end of the base, wherein the insert housing defines an opening sized and shaped to receive a distal end of the ultrasonic scaler and secure the brush device thereto; and
   a cleaning element extending from the second end of the base, wherein the cleaning element is substantially parallel to the longitudinal axis; and
   a tool configured to facilitate removal of the brush device from the ultrasonic scaler, the tool including:
   a first tool end and a second tool end located distal from the first tool end;
   a hole formed on the first tool end, the hole sized to at least partially receive the brush device within the hole; and a slot formed in the second end of the tool, the slot sized to at least partially receive a portion of the brush device for removal of the brush device from the ultrasonic scaler.

2. The system of claim 1, wherein the cleaning element comprises a tuft of bristles.

3. The system of claim 1, wherein the insert housing extends towards the second end more than half a length of the base.

4. The system of claim 1, wherein the insert housing comprises one or more channels defined on an inner surface.

5. The system of claim 1, wherein the base is tapered in width from the first end of the base to the second end of the base.

6. The system of claim 1, wherein the base has a diamond-shaped profile along a length of the base.

7. The system of claim 1, wherein the tool has a dog-leg shape between the first end and the second end of the tool.

8. The system of claim 2, wherein the tuft of bristles comprises a head that is substantially orthogonal to the longitudinal axis.

9. A dental cleaning system for an ultrasonic scaler, the system comprising a brush device for the ultrasonic scaler, the brush device comprising:
a base comprising a first end and an opposite second end, wherein the first end and the second end define a longitudinal axis of the base, wherein the base comprises an elastomeric rubber-like material;
an opening extending through the elastomeric rubber-like material of the base, the opening sized and shaped to receive a distal end of the ultrasonic scaler and to secure the brush device thereto; and
a cleaning element comprising a tuft of bristles and extending from the second end of the base, wherein the cleaning element is substantially parallel to the longitudinal axis; and a tool configured to facilitate removal of the brush device from the ultrasonic scaler, the tool including: a first tool end and a second tool end located distal from the first tool end; a hole formed on the first tool end, the hole sized to at least partially receive the brush device within the hole; and a slot formed in the second end of the tool, the slot sized to at least partially receive a portion of the brush device for removal of the brush device from the ultrasonic scaler.

10. The system of claim 9, wherein the tuft of bristles comprises a head that is substantially orthogonal to the longitudinal axis.

11. The system of claim 9, further comprising an insert housing that extends through the opening towards the second end more than half a length of the base.

12. The system of claim 9, wherein the opening comprises one or more channels defined on an inner surface of the opening.

13. A dental cleaning system for an ultrasonic scaler, the system comprising: a dental brush device for the ultrasonic scaler, the dental brush device including:
a base extending from a first end to an opposite second end along a longitudinal direction;
an opening extending through the base from the first end to the second end, the opening configured to receive a distal end of the ultrasonic scaler and to secure the ultrasonic scaler to the brush device; and
a cleaning element extending away from the second end of the base; and a tool configured to facilitate removal of the dental brush device from the ultrasonic scaler, the tool including: a first tool end and a second tool end located distal from the first tool end; a hole formed on the first tool end, the hole sized to at least partially receive the dental brush device within the hole; and a slot formed in the second end of the tool, the slot sized to at least partially receive a portion of the dental brush device for removal of the dental brush device from the ultrasonic scaler.

14. The system of claim 13, wherein the opening is configured to receive a distal tip of the distal end of the ultrasonic scaler such that the distal tip is locatable proximate the cleaning element to dissipate heat during operation of the ultrasonic scaler.

15. The system of claim 13, wherein the cleaning element includes a tuft of bristles.

16. The system of claim 13, wherein a head of the cleaning element extends substantially orthogonal to the longitudinal direction.

17. The system of claim 13, wherein the opening includes at least one channel defined on an inner surface of the opening, the at least one channel extending radially from the opening and along a length of the opening extending from the first end to the second end, and wherein the channels are configured to enable coolant from the ultrasonic scaler to flow along a lateral surface of the ultrasonic scaler and towards the distal end of the ultrasonic scaler to cool a distal tip of the ultrasonic scaler.

18. The system of claim 14, wherein the cleaning element includes a tuft of bristles.

19. The system of claim 14, wherein the base comprises an elastomeric rubber-type material.

20. The system of claim 18, wherein the tuft of bristles extends substantially parallel to the longitudinal direction.

* * * * *